US006925131B2

(12) United States Patent
Balakrishnan et al.

(10) Patent No.: US 6,925,131 B2
(45) Date of Patent: Aug. 2, 2005

(54) DETERMINING CHANNEL CHARACTERISTICS IN A WIRELESS COMMUNICATION SYSTEM THAT USES MULTI-ELEMENT ANTENNA

(75) Inventors: Jaiganesh Balakrishnan, Ithaca, NY (US); Harish Viswanathan, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 739 days.

(21) Appl. No.: 09/922,203

(22) Filed: Aug. 3, 2001

(65) Prior Publication Data

US 2003/0058926 A1 Mar. 27, 2003

(51) Int. Cl.$^7$ .............................. H04L 27/00; H08B 1/02
(52) U.S. Cl. ...................................... 375/299; 455/101
(58) Field of Search ................................. 375/260, 267, 375/295, 299, 354, 362–366; 370/509–514; 455/91, 101

(56) References Cited

U.S. PATENT DOCUMENTS

| 4,873,724 A | * | 10/1989 | Satoh et al. ................. 704/218 |
| 6,298,095 B1 | * | 10/2001 | Kronestedt et al. ......... 375/295 |
| 6,307,882 B1 | * | 10/2001 | Marzetta ...................... 375/224 |
| 6,473,393 B1 | * | 10/2002 | Ariyavisitakul et al. .... 370/203 |
| 6,600,776 B1 | * | 7/2003 | Alamouti et al. ........... 375/147 |
| 2003/0013468 A1 | * | 1/2003 | Khatri ........................ 455/50.1 |
| 2003/0058926 A1 | * | 3/2003 | Balakrishnan et al. ...... 375/146 |
| 2004/0008760 A1 | * | 1/2004 | Dogan ......................... 375/219 |
| 2004/0223554 A1 | * | 11/2004 | Cha ............................. 375/260 |

OTHER PUBLICATIONS

U.S. Appl. No. 09/112,853, filed Jul. 10, 1998, T. L. Marzetta.
U.S. Appl. No. 09/655,729, filed Sep. 6, 2000, H. C. Huang.
U.S. Appl. No. 09/104,791, filed May 29, 2001, H. C. Huang.

D. V. Sarwate, Bounds On Crosscorrelation And Autocorrelation Of Squences, IEEE Transactions On Information Theory, vol. IT–25, pp. 720–727, Nov. 1979.

L. R. Welch, "Lower Bounds On The Maximum Corsscorrelation Of Signals", IEEE Transactions On Information Theory, vol. IT–20, pp. 397–399, May 1974.

* cited by examiner

*Primary Examiner*—Tesfaldet Bocure
(74) *Attorney, Agent, or Firm*—Irena Rappaport; James Milton

(57) ABSTRACT

A method and apparatus for increasing in the data rate of a multiple-input and/or multiple-output system that has frequency selective fading by using training sequences with both low normalized auto-correlation and low normalized cross-correlation. Both 1) the sum of the square of the normalized auto-correlation of each training sequence over an auto-correlation window and 2) the sum of the square of the normalized cross-correlation of each pair of the training sequences over a cross-correlation window, are significantly less than unity. In one embodiment of the invention the training sequences are shifted versions of each other, and the low normalized cyclic-auto-correlation of cyclic sequences is significantly less than unity, with each cyclic sequence being N', N'=N−L+1, symbols of one of the at least two training sequences. In another embodiment, the training sequences are ones where the trace of the inverse of the product of the matrix of training sequences' symbols and the conjugate transpose of this matrix is low. The matrix is a function of the number of symbols over which multipaths of significant power can arrive, the number of training sequences, and the number of symbols in a training sequence. More particularly the matrix is a block-toeplitzmatrix composed of the training symbols.

34 Claims, 2 Drawing Sheets

DETERMINING CHANNEL CHARACTERISTICS IN A WIRELESS COMMUNICATION SYSTEM THAT USES MULTI-ELEMENT ANTENNA

BACKGROUND OF THE INVENTION

This invention relates to wireless communication systems and, more particularly, to wireless communication systems using multiple antennas at the transmitter and/or multiple antennas at the receiver.

Wireless communication systems that use multiple antennas at the transmitter and optionally multiple antennas at the receiver, so-called multiple-input and/or multiple-output systems, respectively, can achieve dramatically improved capacity compared to single antenna systems, i.e. single antenna to single antenna systems. In random scattering environments increasing the number of antennas at the receiver or at the transmitter (or both) produces a greater capacity.

In multiple-input systems, a primitive data stream—the bits to be transmitted to a particular terminal—is divided into a plurality of sub-streams, each of which is processed, typically by encoding it and modulating it onto a carrier signal. The processed sub-streams are then transmitted. At any particular time, each processed sub-stream is transmitted over a different transmit antenna than the other processed sub-streams.

The transmission paths between the transmit and receive antennas are typically referred to as channels. There is a channel between each transmit and each receive antenna. Each channel has its own channel characteristic.

The signals emanating from the transmit antennas arrive at the receive antennas. Thus, the received signal at each of the receive antennas is typically a superposition of each of the transmitted signals as modified by the channel characteristics. Though the transmitted signals interfere with each other, received signals can be processed to separate the transmitted signals from one another. The separated signals are then decoded to recover the respective sub-streams.

In particular, even if the channel characteristics are not known, the coding and modulation schemes used to process the sub-streams can nonetheless be used to separate the transmitted signals. The use of coding and modulation schemes to separate the transmitted signals is commonly referred to as non-coherent demodulation. In this situation, however, separating out the transmitted signals so that respective sub-streams can be decoded with acceptable packet error rates typically requires transmitting at lower data rates than if the channel characteristics were known.

The channel characteristics may be determined during a training phase during which known symbol sequences, which are referred to as training sequences, are transmitted on each transmit antenna. The essential characteristics of the training sequences are provided to the receiver and transmitter. The receiver processes received training sequences to produce accurate estimates of the channel characteristics between the transmit and receive antennas.

The channel characteristics change over time and, therefore, there is typically a training phase at the start of each transmission burst. Because the training sequences increase the duration of the bursts without increasing their information content, the training sequences reduce the data rate. Thus, it is desirable to keep the duration of the training phase as short as possible. Furthermore, in order to keep the training phase as short as possible, it is also desirable to transmit training sequences concurrently and not sequentially. However, if the training sequences are transmitted concurrently they interfere with each other because the receive antennas receive a superposition of the training sequences. To reduce such interference, the concurrently transmitted training sequences are orthogonal to each other.

SUMMARY OF THE INVENTION

The present inventors have realized that, disadvantageously, if in multiple-input and/or multiple-output systems orthogonality of the training sequences is the only selection criterion used, as is known in the art, then, in some multiple-input and/or multiple-output systems, the data rate still has to be reduced in order to separate out the training sequences. Particularly, this reduction in data rate occurs in systems that have so-called frequency selective fading. Frequency selective fading causes inter-symbol interference. Inter-symbol interference makes it more difficult to separate out the training sequences from each other, and thus the duration of the training sequences must be increased to enable receivers to separate out the training sequences. Thus, in multiple-input and/or multiple-output systems that have frequency selective fading where the only criterion used in selecting training sequences is orthogonality, a longer training sequence is typically required, causing a reduction in the data rate.

The present invention allows for an increase in the data rate of a multiple-input and/or multiple-output system that has frequency selective fading by using training sequences with both low normalized auto-correlation and low normalized cross-correlation, both normalized by the number of symbols in a training sequence. The normalized auto-correlation of a particular training sequence is below an auto-correlation threshold, which is significantly less than unity, and the normalized cross-correlation of a pair of the training sequences is below a cross-correlation threshold, which is also significantly less than unity. Illustratively, the sum of the squares of the normalized auto-correlation values over an auto-correlation window of a particular training sequence is any value less than 0.06, and sum of the squares of the normalized cross-correlation values over a cross-correlation window of a pair of training sequence is any value less than 0.12.

The prior art does know of using low normalized auto-correlation to reduce the inter-symbol interference in single antenna systems that have frequency selective fading. With such a method the prior art is able to obtain acceptable packet error rates without significantly reducing the data rate. However, it remained for the present inventors to appreciate the importance of the training sequence having both low normalized auto-correlation (of the particular training sequences, respectively) and low normalized cross-correlation (of the pairs of training sequences). Indeed, in multiple-input and/or multiple-output systems, the prior art appears to view the orthogonality, i.e. a cross-correlation of zero, of the training sequences as being of paramount importance. The training sequences having both low normalized auto-correlation and low normalized cross-correlation pursuant to the principles of the present invention will not necessary be orthogonal, thereby teaching away from the invention.

In one illustrative embodiment of the invention the training sequences are cyclically shifted versions of each other. Additionally, a particular cyclic sequence has a low normalized cyclic-auto-correlation, normalized by the N'. A particular cyclic sequence is made up of N' symbols (where N'=N−L+1) of a particular training sequence, where L is the window—number of symbols—over which multipaths (defined below) of significant power can arrive, and N is the number of symbols in a training sequence. The normalized cyclic-auto-correlation of a particular cyclic sequence is below a cyclic-auto-correlation threshold, which is significantly less than unity. For example, the sum of the squares of the normalized cyclic-auto-correlation values over a cyclic-auto-correlation window of each of these cyclic sequences is any value less than 0.2.

In another illustrative embodiment, the training sequences are ones where the trace of the inverse of the product of the matrix of training sequences' symbols and the conjugate transpose of this matrix is low. The trace is below a trace threshold, the trace threshold is within a factor of 5 of ML/(N−L+1), M being the number of training sequences. Illustratively, the trace of the inverse of the product of the conjugate transpose of matrix may be any value between ML/(N−L+1) and 5 ML/(N−L+1), inclusive.

The matrix is a function of the number of symbols over which multipaths of significant power can arrive, i.e. the above-defined L, where multipaths are any signals that travel via different paths between the same two antennas. The matrix is also a function of the number of training sequences, i.e. the above-defined M, and the number of symbols in a training sequence, i.e. the above-defined N. More particularly the matrix is a so-called block-toeplitz matrix composed of the training symbols. The blocks of the matrix are L columns by N−L+1 rows, and the number of blocks in the matrix is equal to the number of training sequences.

DETAILED DESCRIPTION

As described above, wireless communication systems that use multiple antennas at the transmitter and optionally multiple antennas at the receiver, so-called multiple-input and/or multiple-output systems, can achieve dramatically improved capacity compared to single antenna systems, i.e., single antenna to single antenna systems. In random scattering environments increasing the number of antennas at the receiver or at the transmitter (or both) produces a greater capacity.

Figure 1:
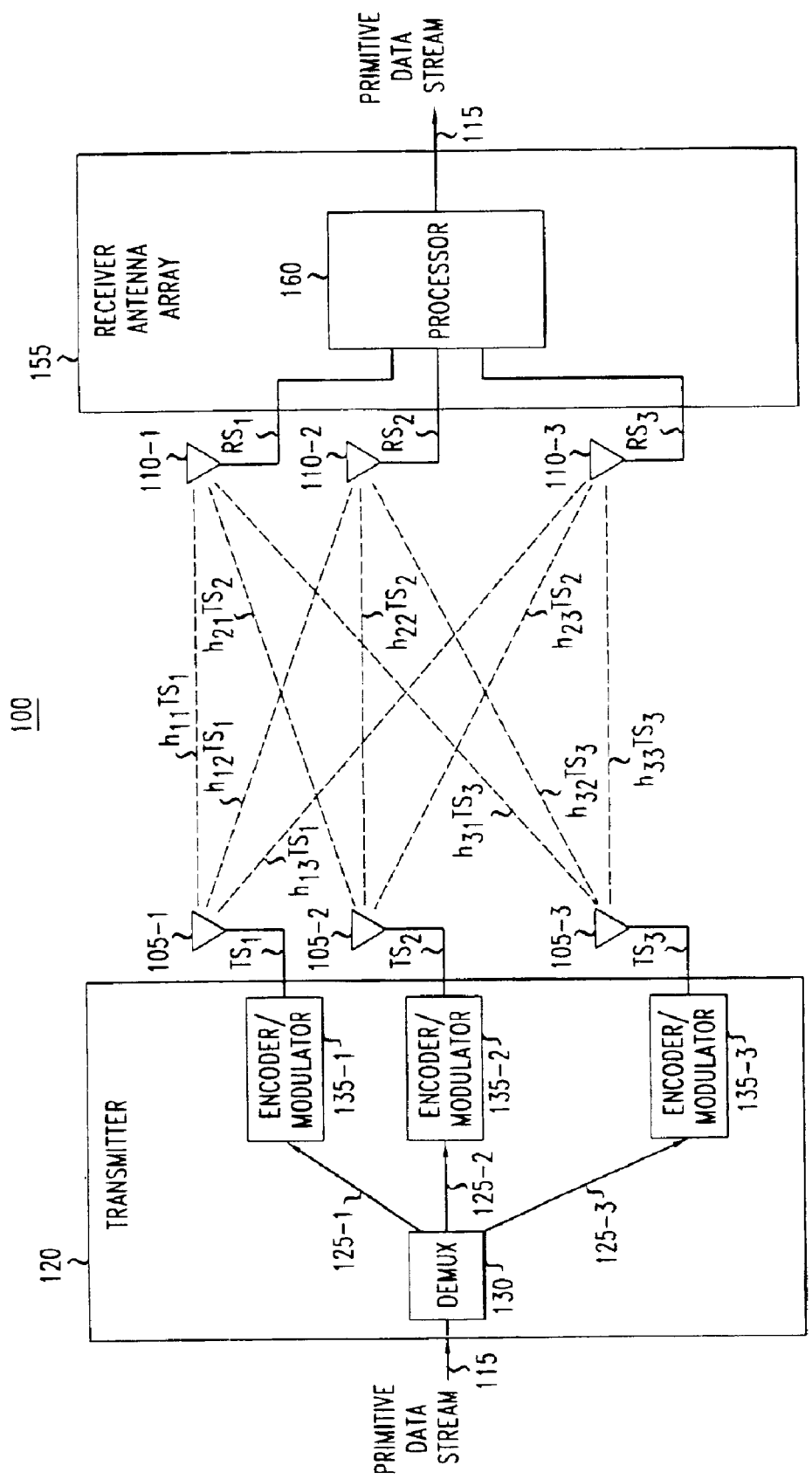
FIG. 1 illustrates a portion of a multiple-input, multiple-output wireless communication system.

FIG. 1 illustrates multiple-input, multiple output wireless communication system 100 having three transmit antennas 105-1, 105-2, and 105-3, and three receive antennas 110-1, 110-2, and 110-3. (Although, system 100 is illustrated as having a particular number of transmit and receive antennas, it is to be understood that system 100 may be implemented with any number of transmit and receive antennas. Similarly, the number of transmit and receive antennas may be different from each other.) In system 100, primitive data stream 115—the bits to be transmitted—is supplied to transmitter 120 where primitive data stream 115 is divided into a plurality of sub-streams 125-1, 125-2, and 125-3 typically by demultiplexing the primitive data stream in demultiplexer 130 into the plurality of sub-streams. (Typically, the number of sub-streams equals the number of transmit antennas, so that at some point in time there is a sub-stream being transmitted on each of the transmit antennas.) The sub-streams are processed, typically encoded and modulated onto a carrier signal in encoder/modulators 135-1, 135-2 and 135-3, respectively, and then transmitted over antennas 105-1, 105-2, and 105-3. At any particular time, each processed sub-stream is transmitted over a different transmit antenna.

The primitive data stream is transmitted in data bursts. (If the system is a time division system, the data bursts are typically one time slot in duration.) Since as described above, the primitive data stream is divided into sub-streams, the data burst includes a plurality of sub-streams, with each sub-stream representing different bits than the other sub-streams of the plurality of sub-streams. As described above, at a particular time at least two of the sub-streams are transmitted over different respective antennas.

There are transmission paths between the transmit and receive antennas. These transmission paths are shown in FIG. 1 and are typically referred as channels. There is a channel between each transmit and each receive antenna. Each channel has its own channel characteristic $h_{nm}$, where n=1, 2, 3 and m=1, 2, 3, and $h_{nm}$ represents the channel characteristics between the nth receive antenna and the $m^{th}$ transmit antenna. These channel characteristics can be represented by a complex matrix H, $$H = \begin{bmatrix} h_{11} & h_{12} & h_{13} \\ h_{21} & h_{22} & h_{23} \\ h_{31} & h_{32} & h_{33} \end{bmatrix} \quad (1)$$

Thus, the signal $h_{nm}TS_m$ on each channel is the transmitted signal from the channel's corresponding transmit antenna as modified by the channel characteristics.

The transmitted signals $TS_1$, $TS_2$, and $TS_3$, modified by the appropriate channel characteristics, arrive at the receive antennas 110-1, 110-2, and 110-3. Thus, typically, the received signal $RS_1$, $RS_2$, and $RS_3$ at the receive antennas is a superposition of the transmitted signals $TS_1$, $TS_2$, and $TS_3$ as modified by the channel characteristics, plus noise vector η, making the receive antenna signals:

$$RS_1 = h_{11}TS_1 + h_{12}TS_2 + h_{13}TS_3 + \eta_1 \quad (2)$$

$$RS_2 = h_{21}TS_1 + h_{22}TS_2 + h_{23}TS_3 + \eta_2 \quad (3)$$

$$RS_3 = h_{31}TS_1 + h_{32}TS_2 + h_{33}TS_3 + \eta_3 \quad (4)$$

Even though the transmitted signals $TS_1$, TS2 and $TS_3$, interfere with each other, the latter can be processed to separate the transmitted signals from one another. The separated-out signal $TS_1$, $TS_2$ and $TS_3$ can be decoded to recover the respective sub-streams 125-1, 125-2, and 125-3, which would then be multiplexed together to get primitive data stream 115.

The transmitted signals $TS_1$, $TS_2$, and $TS_3$ are received with signal-to-noise plus interference ratios, where the interference includes interference from concurrently transmitted signals. For ease of reference the signal-to-(noise plus interference) ratio will be referred to throughout as the signal-to-noise ratio (SNR). A particular transmitted signal $TS_1$, $TS_2$, or $TS_3$ needs to be received with an SNR that is high enough to allow it to be sufficiently separated from the others that the sub-streams 125-1, 125-2, and 125-3 can thereafter be decoded with an acceptable packet error rate. The type of information represented by the primary data stream and the desired use of this information determines a maximum tolerable acceptable packet error rate. For example, if the information represented by the primary data stream is voice, an acceptable packet error rate may be 1%; and if that information is sensitive financial data, then an acceptable packet error rate may be 0.001%. Furthermore, the acceptable packet error rate may be fine-tuned as a tradeoff between the desire to increase the quality of the signal and the desire to increase the data rate of the system.

As described above, knowledge of the channel characteristics allows transmission at higher data rates than if the channel characteristics are not known, while still allowing the transmitted signals to be separated so that their respective sub-stream are decoded with acceptable packet error rates.

The channel characteristics may be determined by receiver 155 during a training phase during which known symbol sequences, which are referred to as training sequences, are transmitted on the transmit antennas. Estimating the channel characteristics is also referred to as channel estimation. The essential characteristics of the training sequences are provided to the receiver and transmitter. The length of the training sequences is a tradeoff between keeping the training sequences long to obtain the channel characteristics as accurately as possible and keeping the training sequences short so as to minimize the decrease in the data rate. Preferably, the training sequences are long enough to be able to obtain the channel characteristics accurately enough to be able to use these channel characteristics to separate out the sub-stream well enough so that the sub-streams can be decoded with an acceptable packet error rate. Yet, the training sequences are short enough to minimize the decrease in the data rate due to the training overhead. For example, as described in more detail below, for a two-antenna system where significant multipaths can arrive over seven symbols, the length of the training sequence, i.e. N, can be 26. Similarly, for a four-antenna system where significant multipaths can arrive over five symbols, N can be 36. (Multipath are signals that travel via different paths between the same two antennas.)

The training sequences are transmitted on transmit antennas 105-1, 105-2, and 105-3. Typically, one training sequence is transmitted on each transmit antenna. The training sequences, modified by the appropriate channel characteristics, arrive at the receive antennas 110-1, 110-2, and 110-3. Thus, typically, the received signal $RS_1$, $RS_2$, and $RS_3$ at each of the receive antennas is a superposition of each of the training sequences as modified by the channel characteristics, plus noise. Receiver 155 processes received signals to obtain the training sequences. Processor 160 of receiver 155 then processes the training sequences to produce accurate estimates of the channel characteristics, i.e. the $h_{nm}$'s, between the transmit and receive antennas.

The channel characteristics change over time and, therefore, there is typically a training phase at the start of each data burst. As described above, because the training sequences increase the duration of the bursts without increasing their information content, the training sequences reduce the data rate. Thus, it is desirable to keep the duration of the training phase as short as possible. Furthermore, in order to keep the training phase as short as possible, it is also desirable to transmit training sequences concurrently and not sequentially. However, if the training sequences are transmitted concurrently they interfere with each other because the receive antennas receive a superposition of the training sequences. To reduce such interference, the concurrently transmitted training sequences are orthogonal to each other.

Figure 2:
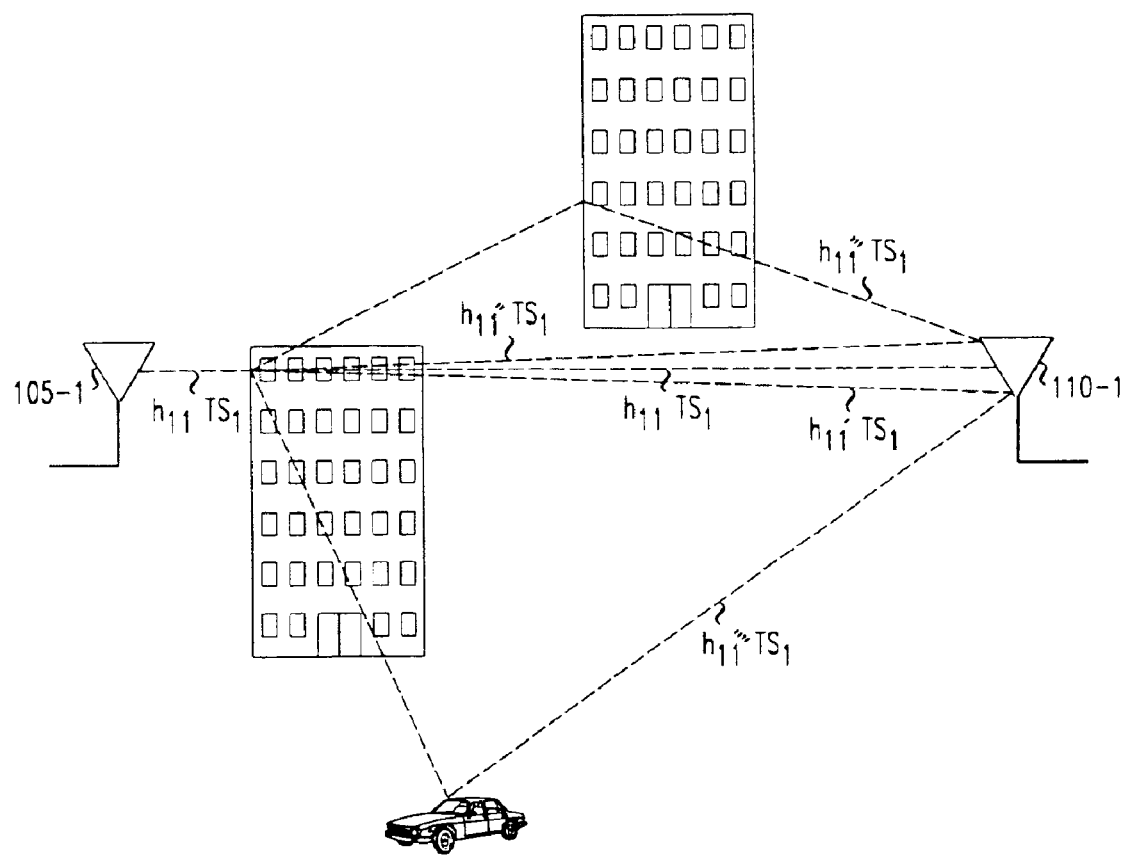
FIG. 2 illustrates in more detail the transmission paths between one transmit antenna and one receive antenna of FIG. 1.

The present inventors have realized that, disadvantageously, if in multiple-input and/or multiple-output systems orthogonality of the training sequences is the only selection criterion used, as is known in the art, then, in some multiple-input and/or multiple-output systems, the data rate still has to be reduced in order to separate out the training sequences. Particularly, this reduction in data rate occurs in systems that have so-called frequency selective fading. FIG. 2 shows the environment where frequency selective fading can occur. In particular FIG. 2 shows the transmission paths between one transmit antenna, 105-1, and one receive antenna, 110-1 of FIG. 1. As can be seen, the transmitted signal $TS_1$ divides into several signals that travel between the two antennas via different paths and are therefore modified by different channel characteristics. Thus, the signals between transmit antenna 105-1 and receive antenna 110-1 are $h_{11}TS_1$ $h_{11}'TS_1$ $h_{11}''TS_1$ $h_{11}'''TS_1$ $h_{11}''''TS_1$, these several signals are commonly referred to as multipaths.

Frequency selective fading results from the difference in the time of arrival between any multipaths $h_{11}TS_1$ $h_{11}'TS_1$ $h_{11}''TS_1$ $h_{11}'''TS_1$ of significant power being more than half of the symbol duration apart, where significant power is typically any power within 10 dB of the power of the strongest of the multipaths. Typically, the number symbols over which multipaths of significant power—also referred to herein as significant multipaths—can arrive is specified by the standard to which system 100 complies.

Frequency selective fading causes inter-symbol interference. Inter-symbol interference makes it more difficult to estimate the channel characteristics from the training sequences, and thus the duration of the training sequences must be increased to enable receiver 155 to estimate the channel characteristics from the training sequences. Thus, in multiple-input and/or multiple-output systems that have frequency selective fading where the only criterion used in selecting training sequences is orthogonality, a longer training sequence is typically required, causing a reduction in the data rate.

The present invention allows for an increase in the data rate of a multiple-input and/or multiple-output system that has frequency selective fading by using training sequences with both low normalized auto-correlation and low normalized cross-correlation. The training sequences are different from each other. The normalized auto-correlation of a particular training sequence is below an auto-correlation threshold, which is significantly less than unity, and the normalized cross-correlation of a pair of the training sequences is below a cross-correlation threshold, which is also significantly less than unity. Illustratively, the sum of the squares of the normalized auto-correlation values over an auto-correlation window of a particular training sequence is any value less than 0.06, and sum of the squares of the normalized cross-correlation values over a cross-correlation window of a pair of training sequence is any value less than 0.12. Thus, the normalized auto-correlation, i.e.

$$R_{c1c1}(\tau) = \frac{1}{N} \sum_{k=-\infty}^{\infty} c1(k)c1(k-\tau),$$

where c is the training sequence, of a particular training sequence is taken over an auto-correlation window. As can be seen from the last sentence, the auto-correlation is normalized by dividing it by N. The auto-correlation window is equal to $-L+1$ to $L-1$, excluding 0, L being the number of symbols over which multipaths of significant power can arrive, i.e. $\tau=-L+1, \ldots -1, 1, \ldots L-1$. For example, when L=5 then the sum of the squares of the normalized auto-correlation values over the auto-correlation window for a particular training sequence is the sum of the squares of the normalized auto-correlations performed between the training sequence and itself shifted, respectively, by 1, 2, 3, and 4 symbols forward and between itself and itself shifted, respectively by 1, 2, 3, and 4 symbols backward. Thus, in this case, there are eight normalized auto-correlation values for a training sequence.

Similarly, the normalized cross-correlation, i.e.

$$R_{c1c2}(\tau) = \frac{1}{N} \sum_{k=-\infty}^{\infty} c1(k)c2(k-\tau),$$

of a pair of training sequences is taken over a cross-correlation window. As can be seen from the last sentence, the cross-correlation is normalized by dividing it by N. The cross-correlation window is equal to $-L+1$ to 0 and 0 to $L-1$, i.e. $\tau=-L+1, -L+2, \ldots 0, 0, 1, \ldots L-1$. For example, when $L=5$ then the sum of the squares of the normalized cross-correlation values over the cross-correlation window for a pair of training sequences is the sum of the squares of the normalized cross-correlations performed between the first training sequence and the second training sequence shifted by 0, 1, 2, 3, and 4 symbols, forward and 0, 1, 2, 3, and 4 symbols backward. Thus, in this case, there are ten normalized cross-correlation values for each pair of training sequences.

It is to be noted that in accordance with the invention the sum of the squares of the normalized auto-correlation of a particular training sequence and the sum of the squares of the normalized cross-correlation of a pair of training sequences are not required to be calculated. In accordance with the invention, the training sequences need only meet the criterion that the sum of the squares of the normalized auto-correlation of a particular training sequence is below the auto-correlation threshold, and that the sum of the squares of the normalized cross-correlation of a pair of training sequences is below the cross-correlation threshold.

Particularly, the training sequences should have a normalized auto-correlation and normalized cross-correlation that allow the training sequences to be used to estimate the channel characteristics accurately enough so that the packet error rate of the sub-streams is at or below a certain threshold packet error rate. In typical systems the threshold packet error rate is below 1%. Although, as described above, the threshold packet error rate is dependent on the type of information represented by the transmitted signal and the desired use of this information, and on the tradeoff between the quality of the signal and the data rate of the system.

Illustratively, the training sequences are such that they can be used to determine channel characteristics so that the amount of signal power at which the sub-streams are transmitted to be able to decode the data burst with a particular packet error rate is within 2 dB of the amount of power at which a data burst would be transmitted in single antenna system from a base station in the same location to be able to decode the data burst at the particular packet error rate. For example, the small amount of additional signal power is illustratively less than 1 to 2 dB.

The closer the normalized cross-correlation of the pairs of training sequences is to zero the less they interfere with each other and the easier it is to obtain the channel characteristics with enough accuracy. The closer the normalized auto-correlation of each of the training sequences is to zero the less they interfere with themselves, again making it easier to separate out the training sequences. The latter is particularly true in systems where symbol duration is long enough so that it is likely that significant multipaths will arrive one half a symbol duration apart.

The prior art does know of using low normalized auto-correlation to reduce the inter-symbol interference in single antenna systems that have frequency selective fading. With such a method the prior art is able to obtain acceptable packet error rates without significantly reducing the data rate. However, it remained for the present inventors to appreciate the importance of the training sequence having both low normalized auto-correlation (of the particular training sequences, respectively) and low normalized cross-correlation (of the pairs of training sequences). Indeed, in multiple-input and/or multiple-output systems, the prior art appears to view the orthogonality, i.e. a cross-correlation of zero, of the training sequences as being of paramount importance. The training sequences having both low normalized auto-correlation and low normalized cross-correlation pursuant to the principles of the present invention will not necessary be orthogonal, thereby teaching away from the invention.

Training sequences with both low normalized auto-correlation of the particular training sequences and low normalized cross-correlation of pairs of training sequences will typically mean that the normalized auto-correlation of the particular training sequences and normalized cross-correlation of pairs of training sequences are relatively close to each other. That is the difference between the normalized auto and cross-correlations of the training sequences is at or below a difference threshold. For example, the normalized auto-correlation of the particular training sequences and normalized cross-correlation of pairs of training sequences can be of any value within 0.2 of each other, which would make the difference threshold 0.2. The prior art does not appear to suggest any relationship between normalized auto-correlation and normalized cross-correlation. There is no incentive in the prior to have any relationship between the normalized auto and cross-correlations since each produced the desired result in the environment in which it was used. It remained for the present inventors to realize that it is beneficial in some environments to have a low normalized auto-correlation and a low normalized cross-correlation, where the normalized auto and cross-correlations are close to each other.

In the present invention, the training sequence with low normalized auto-correlation and low normalized cross-correlation can be selected in lo any manner. In one illustrative embodiment the training sequences can be selected through a random search by selecting a large number of training sequences, and taking the normalized auto-correlation of the particular training sequences and the normalized cross-correlations of the pairs of training sequences over the above described auto-correlation window of $-L+1$ to $L-1$, excluding 0, and cross-correlation window of $-L+1$ to 0 and 0 to $L-1$, respectively. Then obtain the sum of the squares of the normalized auto-correlation values for each of the training sequences, and the sum of the squares of the normalized cross-correlation values for each of the pair of training sequences. Of all of the training sequences that whose normalized auto and cross-correlations are determined, the ones that have the lowest sum of the squares of the normalized auto and cross correlations values over the, respective, auto and cross-correlation windows are then selected to be the training sequences to be used. For example, to begin with, training sequences with low normalized auto-correlation properties can be determined by searching over some or even all of the possible sequences. This is followed up with a search for M sequences with low normalized cross-correlation properties from the reduced set of training sequences that have low normalized auto-correlation. For further information on the auto and cross correlation of sequences see for example, D. V. Sarwate, "Bounds on crosscorrelation and autocorrelation of sequences", IEEE Transactions on Information Theory, vol. IT-25, pp. 720–727, November 1979 and L. R. Welch, "Lower bounds on the maximum crosscorrelation of signals", IEEE Transactions on Information Theory, vol. IT-20, pp. 397–399, May 1974, both incorporated herein by this reference.

In another illustrative embodiment, the training sequences are ones where the trace—sum of the diagonal elements of the matrix—of the inverse of the product of matrix of training sequences' symbols, referred to herein as S and the conjugate transpose of matrix S is within a predetermined factor of ML/(N−L+1). As described above, L is the number of symbols over which multipaths of significant power can arrive, N is the number of symbols in a training sequence, and M is number of training sequences. For example, the trace of the inverse of the product of matrix S and the conjugate transpose of matrix S may be any value between ML/(N−L+1) and 5 ML/(N−L+1), inclusive. Matrix S is a function of the number of symbols over which multipaths of significant power can arrive. As described above, the number of symbols over which multipaths of significant power can arrive is typically specified in the standard to which the system complies, typically though a significant multipath is one whose power is within 10 dB of the power of the strongest multipath. For example in a North American Time Division Multiple Access (TDMA) system where the bandwidth is 30 KHz the number of symbols over which multipaths of significant power can arrive is one, i.e. L=1. In a Group Special Mobile (GSM) system that services a typical urban environment where the bandwidth is 200 KHz the number of symbols over which multipaths of significant power can arrive is six, i.e. L=6.

In the illustrative embodiment, in addition to being a function of the number of symbols over which multipaths of significant power can arrive, i.e. the above-defined L, the matrix is also a function of the number of training sequences, i.e. the above-defined M, and the number of symbols in a training sequence, i.e. the above-defined N. More particularly the matrix is a so-called block-toeplitz matrix composed of the training symbols. A block-toeplitz matrix is a matrix that includes at least two toeplitz matrices, each of these toeplitz matrixes is referred to as a block of the block-toeplitz matrix. A toeplitz matrix is one where each succeeding row of the matrix contains the elements of the preceding row shifted by one with a new final entry.

The number of blocks in the block-toeplitz matrix of the illustrative embodiment is equal to the number of training sequences with the blocks being L columns by N−L+1 rows. Particularly, the matrix S can be, $$S = \begin{bmatrix} S_1(N) & S_1(N-1) & S_1(N-2) \\ S_1(N-1) & S_1(N-2) & S_1(N-3) \\ S_1(N-2) & S_1(N-3) & S_1(N-4) & \cdots \\ \vdots & \vdots & \vdots \\ S_1(L+1) & S_1(L) & S_1(L-1) \\ S_1(L) & S_1(L-1) & S_1(L-2) \end{bmatrix} \quad (5)$$

-continued
$$\begin{matrix} S_1(N-L+1) & S_2(N) & S_2(N-1) & S_2(N-2) \\ S_1(N-L) & S_2(N-1) & S_2(N-2) & S_2(N-3) \\ S_1(N-L-1) & S_2(N-2) & S_2(N-3) & S_2(N-4) & \cdots \\ \vdots & \vdots & \vdots & \vdots \\ S_1(2) & S_2(L+1) & S_2(L) & S_2(L-1) \\ S_1(1) & S_2(L) & S_2(L-1) & S_2(L-2) \end{matrix}$$

$$\begin{matrix} S_2(N-L+1) \\ S_2(N-L) \\ S_2(N-L-1) & \cdots \\ \vdots \\ S_2(2) \\ S_2(1) \end{matrix}$$

$$\begin{matrix} S_M(N) & S_M(N-1) & S_M(N-2) \\ S_M(N-1) & S_M(N-2) & S_M(N-3) \\ S_M(N-2) & S_M(N-3) & S_M(N-4) & \cdots \\ \vdots & \vdots & \vdots \\ S_M(L+1) & S_M(L) & S_M(L-1) \\ S_M(L) & S_M(L-1) & S_M(L-2) \end{matrix}$$

$$\begin{bmatrix} S_M(N-L+1) \\ S_M(N-L) \\ S_M(N-L-1) \\ \vdots \\ S_M(2) \\ S_M(1) \end{bmatrix},$$

where $S_x(y)$ is the $y^{th}$ symbol of the $x^{th}$ training sequence. As described above, is the number of training sequences, L is the number of symbols over which multipaths of significant power can arrive, and N is the number of symbols in a training sequence. For example, the trace of the inverse of the product of matrix S and the conjugate transpose of matrix S, i.e. $\text{tr}\{(S^HS)^{-1}\}$, is any value between ML/(N−L+1) and 5 ML/(N−L+1), inclusive, and is preferably any value between ML/(N−L+1) and 1.2 ML/(N−L+1), inclusive.

The training sequence is optimized to minimize the channel estimation error. The minimum channel estimation error is obtained if and only if $$S^HS = (N-L+1)\sigma_s^2 I_{ML}, \quad (6)$$

where $\sigma_s^2$ is the variance of the source symbols, that is the energy of a transmitted symbol, and $I_{ML}$ is a matrix whose diagonal entries are 1 and the rest of entries are 0. Thus, training sequences that minimize the channel estimation error are ones that when put into the form of matrix S will result in $S^HS$ being a matrix whose diagonal entries are $(N-L+1)\sigma_s^2$ and the rest of whose entries are 0.

(Note that for the channel characteristics to be identifiable the auto-correlation matrix $S^HS$ of equation (6) has to be invertable. Hence, the training sequence matrix S has to be of full column rank. For matrix S to be full column rank, (N−L+1) should be greater than or equal to ML, i.e. (N−L+1)≧ML.)

Near-optimal sequences can be obtained by searching over all 20 possible sequences and choosing the set of training sequences that have a low or the minimum value of $\text{tr}\{(S^HS)^{-1}\}$, that is the set of training sequences ones whose $\text{tr}\{(S^HS)^{-1}\}$ is closest to ML/(N−L+1). Thus, for example, the training sequences can be selected through a random search by selecting a large number of training sequences, placing them into the S matrix and selecting from them the ones that have the minimum values of $\text{tr}\{(S^HS)^{-1}\}$, that is ones whose $\text{tr}\{(S^HS)^{-1}\}$ is closest to ML/(N−L+1). For example, to begin with, sequences with low normalized auto-correlation properties can be determined by searching over some or even all of the possible sequences. The training sequences with low normalized auto-correlation can then be placed into the S matrix and the set of these training sequences that produce the minimum value of $tr\{(S^H S)^{-1}\}$, out of the sets of the training sequences, is selected to be the training sequences to be used. Similarly, sequences with low normalized cross-correlation properties can be determined by searching over some or even all of the possible sequences. The training sequences with low normalized cross-correlation can then be placed into the S matrix and the set of these training sequences that produce the minimum values of $tr\{(S^H S)^{-1}\}$, out of the sets of the training sequences, is selected to be the training sequences to be used.

Both random searches are somewhat computationally lengthy. In another illustrative embodiment of the invention, training sequences that are easier to find are selected. The training sequences are cyclically shifted versions of each other, with particular cyclic sequences, each of which are N' (N'=N−L+1) symbols of a particular training sequence, having low normalized cyclic-auto-correlation. The normalized cyclic-auto-correlation of a particular cyclic sequence is below a cyclic-auto-correlation threshold, which is significantly less than unity. For example, the sum of the squares of the normalized cyclic-auto-correlation values over a cyclic-auto-correlation window of each of these cyclic sequences is any value less than 0.2. Normalized cyclic-auto-correlation is given by:

$$\frac{1}{N'} \sum_{k=0}^{N'-1} S(k) S(\overline{(k-\tau)} \bmod N') \text{ where } \tau \neq 0 \text{ and } N' = N - L + 1.$$

As can be seen from the last sentence, the cyclic-auto-correlation is normalized by dividing it by N'. The cyclic-auto-correlation window is 0 to N', that is τ=1, 2, ... N'. Thus, the sum of the squares of the normalized cyclic-auto-correlation values over the cyclic-auto-correlation window of the cyclic sequences is the sum of the squares of the normalized cyclic-auto-correlations performed between a cyclic sequence and itself shifted by 0, 1, 2, ... N' symbols.

Thus, the training sequences can be selected by choosing a starting cyclic sequence that has low normalized cyclic-auto-correlation, and cyclic shifting this cyclic sequence to get the other cyclic sequences. For example, starting from a sequence of $t_1=[s(1) \ldots s(N')]$ of length N', where N'=N−L+1 and s(y) is the $y^{th}$ symbol of the training sequence, the sequences $t_2 \ldots t_M$ are constructed by cyclic-shifts of the sequence $t_1$. Thus, the sequence $t_{k+1}=[s(k\delta+1) \ldots s(N') s(1) \ldots s(k\delta)]$ is obtained by a cyclic-shift of kδ of the sequence $t_1$, where $\delta=\lfloor N/M \rfloor$. New training sequences $c_1, \ldots, C_M$ are constructed by adding a cyclic-prefix of length L−1 to the sequences $t_1 \ldots t_M$. For example, $c_1=[s(N'-L+2) \ldots s(N') s(1) \ldots s(N')]$. Note that the new sequences $c_k$ are of length N.

The resulting training sequences are referred to herein as the 20 training sequence set. The training sequence set is put into the S matrix form. The trace of the inverse of the product of the S matrix and the conjugate transpose of the S matrix is found. The training sequence selected to be used are the ones whose training sequence set has the smallest $tr\{(S^H S)^{-1}\}$ of the training sequence sets so tested. That is the training sequence set whose $tr\{(S^H S)^{-1}\}$ is closest to ML/(N−L+1).

In a frequency reuse architecture, some base stations use the same frequencies. The channels that use the same frequency are commonly referred to as co-channels. It may be beneficial for a base station that has co-channels to use a different training sequence on a channel using a particular frequency then is used by the other base stations when they use this particular frequency. Using different training sequences on the co-channels mitigates the effect of co-channel interference on the estimation of channel characteristics.

Following are some example system and training sequence sets that can be used in these systems. In a system where the base station has two transmit antennas and L=7, a training sequence of 26 symbols, i.e. N=26, can be used to obtain the channel characteristics with enough accuracy to decode the transmitted signals with an acceptable packet error rate. Table 1 shows eight pairs of training sequences that can be used. These training sequences are in hexadecimal format. The most-significant-bit of the hexadecimal representation corresponds to the first symbol of the training sequence. The bit 1 corresponds to the symbol "+1" and the bit 0 to the symbol "−1". The penalty incurred, in terms of the loss in effective signal to noise ration due to estimation of channel characteristics by these training sequences over signal to noise ratio if ideal training sequences had been used, when L =7 is as small as 0.16 dB.

TABLE 1

Near-optimal Training Sequences for M = 2

| Antenna 1 | Antenna 2 |
|---|---|
| 0FB5D8F | 293BE29 |
| 0391483 | 251F725 |
| 3785377 | 0BB9F4B |
| 3BB287B | 0B4188B |
| 1D2F9DD | 21135E1 |
| 11182D1 | 21EB221 |
| 2F0A6EF | 1773E97 |
| 3DD943D | 05A0C45 |

In a system where the base station has four transmit antennas and L=5, a training sequence of 36 symbols, i.e. N=36, can be used to obtain the channel characteristics with enough accuracy to decode the transmitted signals with an acceptable packet error rate. Table 2 shows eight pairs of training sequences that can be used. These training sequences are in hexadecimal format. The most-significant-bit of the hexadecimal representation corresponds to the first symbol of the training sequence. The bit 1 corresponds to the symbol "+1" and the bit 0 to the symbol "−1". The penalty incurred, in terms of the loss in effective signal to noise ratio due to channel estimation by these training sequences over signal to noise ratio if ideal training sequences had been used, when L=7 is as small as 0.14 dB.

| Antenna 1 | Antenna 2 | Antenna 3 | Antenna 4 |
|---|---|---|---|
| 0A7076510 | 7076510A7 | 76510A707 | 510A70765 |
| 2F9291822 | 9291822F9 | 91822F929 | 822F92918 |
| 517A46305 | 7A4630517 | 4630517A4 | 30517A463 |
| C2D45980C | D45980C2D | 5980C2D45 | 80C2D4598 |
| 2D8B8E402 | 8B8E402D8 | 8E402D8B8 | 402D8B8E4 |
| B6E05238B | E05238B6E | 5238B6E05 | 38B6E0523 |
| 59B80A8E5 | B80A8E59B | 0A8E59B80 | 8E59B80A8 |
| CC876AEBC | 876AEBCC8 | 6AEBCC876 | EBCC876AE |

Returning to FIG. 1, it can be observed that the training sequences of the present invention can be used with existing transmitters and receivers. Thus, the present invention can be used with existing equipment of systems that use training sequences, such as GSM or wideband TDMA systems. Thus, by using the training sequences proposed in the present invention, systems that use training sequences can be made into multiple-input and/or multiple-output systems in the known ways of making single antenna systems into multiple-input and/or multiple-output systems. For example, a single antenna system can be made into a multiple-input, multiple-output system by adding demultiplexer 130 and appropriate encoder/modulators 135-1, 135-2, and 135-3 at transmitter 120, and by adding appropriate equipment at receiver 155 to separate out the transmitted signals. Therefore, the present invention allows transmitting at least two sub-streams in the same time slot, the sub-streams transmitted over different respective transmit antennas and representing information that is not identical to the information represented by the other sub-streams. Each sub-stream including a training sequence that is different than the training sequence of the other sub-streams, where the training sequence is not sent concurrently with the portion of the sub-stream representing the other data of the sub-stream.

The foregoing is merely illustrative and various alternatives will now be discussed. For example, in the illustrative embodiment the multiple-input, multiple-output system is used to increase the data rate by transmitting signal representing difference information over respective transmit antennas. In alternative embodiments, multiple-input and/or output systems can be used in delay diversity mode to reduce packet error rate. In the delay diversity mode the same signal is transmitted on multiple antennas but with a delay between the transmission on subsequent antennas. The duration of the delay is preferably one symbol, although the delay can be up to several symbols is duration. In this case, the training sequences can be selected as described above to have low normalized auto-correlation and low normalized cross-correlation, or alternatively, the same training sequence can be used on all of the transmit antennas.

In the illustrative embodiment the system is a multi-input, multi-output system. In the alternative embodiments the system can be just a multi-input system.

The transmitter and receiver of the illustrative embodiments can be any transmitter and receiver of a wireless communication system. For example, in one illustrative embodiment the transmitter can be part of a base station and the receiver part a mobile terminal, and/or vice versa, i.e. the transmitter can be part of the mobile terminal and the receiver part of the base station. In another illustrative embodiment the transmitter can be part of a wireless hub of a wireless local area network and the receiver part a terminal of a wireless local area network, such as a laptop, and/or vice versa. In yet another illustrative embodiment each of the transmitter and receiver can be part of a fixed wireless network, for example the transmitter and receiver can be part of a fixed wireless system set up for communication between two buildings.

The block diagrams presented in the illustrative embodiments represent conceptual views of illustrative circuitry embodying the principles of the invention. Any of the functionally of the illustrative circuitry can be implemented as either a single circuit or as multiple circuits. The functionality of multiple illustrative circuitry can also be implemented as a single circuit. Additionally, one or more of the functionally of the circuitry represented by the block diagrams may be implemented in software by one skilled in the art with access to the above descriptions of such functionally.

Thus, while the invention has been described with reference to a preferred embodiment, it will be understood by those skilled in the art having reference to the specification and drawings that various modifications and alternatives are possible therein without departing from the spirit and scope of the invention.

We claim:

1. A method for use in a system that is adapted to transmit a data burst over at least two antennas, the method comprising the step of:

transmitting at least two training sequences, each of the at least two training sequences being transmitted via a different respective one of said antennas, each of the at least two training sequences having a normalized auto-correlation below an auto-correlation threshold, the auto-correlation threshold being significantly less than unity, and each pair of the at least two training sequences having a normalized cross-correlation below a cross-correlation threshold, the cross-correlation threshold being significantly less than unity.

2. The method of claim 1, wherein each of the at least two training sequences having the normalized auto-correlation below the auto-correlation threshold comprises a sum of the squares of a normalized auto-correlation of one of the at least two training sequences over an auto-correlation window being below the auto-correlation threshold.

3. The method of claim 1, wherein each pair of the at least two training sequences having the normalized cross-correlation below the cross-correlation threshold comprises a sum of the squares of a normalized cross-correlation of the pair of the at least two training sequences over a cross-correlation window being below the cross-correlation threshold.

4. The method of claim 1, wherein the auto-correlation threshold is 0.06.

5. The method of claim 1, wherein the cross-correlation threshold is 0.12.

6. The method of claim 1, wherein:

the normalized auto-correlation is an auto-correlation normalized by the number of symbols in one of the training sequences, and the normalized cross-correlation is a cross-correlation normalized by the number of symbols in one of the training sequences.

7. The method of claim 1, wherein the system exhibits frequency selective fading.

8. The method of claim 1, wherein:

the data burst includes a plurality of sub-streams, each sub-stream representing different bits than the other sub-streams of the plurality of sub-streams; and at a particular time each of at least two of the sub-streams are transmitted over a different respective antenna of the at least two antennas.

9. The method of claim 1, wherein the cross-correlation is taken over a cross-correlation window of $-L+1$ to 0 and 0 to $L-1$, L being the number of symbols over which multipaths of significant power can arrive.

10. The method of claim 1, wherein the auto-correlation is taken over an auto-correlation window of $-L+1$ to $L-1$, excluding 0, L being the number of symbols over which multipaths of significant power can arrive.

11. The method of claim 1, wherein:

the system is adapted to transmit a plurality of data bursts; and the transmitting step is repeated for each data burst.

12. A method for use in a system that is adapted to transmit a data burst over at least two antennas, the method comprising the step of:

transmitting at least two training sequences, each of the at least two training sequences being transmitted via a different respective one of said antennas, the training sequences being shifted versions of each other, with each cyclic sequence having a normalized cyclic-auto-correlation below a cyclic-auto-correlation threshold, each cyclic sequence being N', N'=N−L+1, symbols of one of the at least two training sequences, the cyclic-auto-correlation threshold being significantly less than unity, L being the number of symbols over which multipaths of significant power can arrive, and N being the number of symbols in one of the training sequences.

13. The method of claim 12, wherein each cyclic sequence having the normalized cyclic-auto-correlation below the cyclic-auto-correlation threshold comprises a sum of the squares of a normalized cyclic-auto-correlation of one of the cyclic sequences over a cyclic-auto-correlation window being below the cyclic auto-correlation threshold.

14. The method of claim 12, wherein the cyclic-auto-correlation threshold comprises 0.2.

15. The method of claim 12, wherein the normalized cyclic-auto-correlation is a cyclic-auto-correlation normalized by N'.

16. The method of claim 12, wherein the system exhibits frequency selective fading.

17. The method of claim 12, wherein:

the data burst includes a plurality of sub-streams, each sub-stream representing different bits than the other sub-streams of the plurality of sub-streams; and at a particular time each of at least two of the sub-streams are transmitted over a different respective antenna of the at least two antennas.

18. The method of claim 12, wherein:

the system is adapted to transmit a plurality of data bursts; and the transmitting step is repeated for each data burst.

19. A method for use in a system that is adapted to transmit a data burst over at least two antennas, the method comprising the step of:

transmitting at least two training sequences, each of the at least two training sequences being transmitted via a different respective one of said antennas, a trace of an inverse of a product of a matrix of symbols of the at least two training sequences and a conjugate transpose of the matrix is below a trace threshold, the trace threshold being below 5 ML/(N−L+1), L being the number of symbols over which multipaths of significant power can arrive, M being the number of training sequences, and N being the number of symbols in one of the training sequences.

20. The method of claim 19, wherein the trace threshold is 1.2 ML/(N−L+1).

21. The method of claim 19, wherein the matrix is a function of at least one of the following:

the number of symbols over which multipaths of significant power can arrive;

the number of training sequences; and the number of symbols of one of the training sequences.

22. The method of claim 19, wherein matrix is a block-toepliz matrix.

23. The method of claim 22, wherein the block-toepliz matrix includes:

M blocks, M being the number of training sequences, each block having L columns, L being the number of symbols over which multipaths of significant power can arrive, and each block having N−L+1 rows, N being the number of symbols in one training sequence.

24. The method of claim 19, wherein the system exhibits frequency selective fading.

25. The method of claim 19, wherein:

the system is adapted to transmit a plurality of data bursts; and the transmitting step is repeated for each data burst.

26. A transmitter adapted to be coupled to at least two antennas, the transmitter being further adapted to transmit at least two training sequences, each of the at least two training sequences being transmitted via a different respective one of said antennas, each of the at least two training sequences having a normalized auto-correlation below an auto-correlation threshold, the auto-correlation threshold being significantly less than unity, and each pair of the at least two training sequences having a normalized cross-correlation below a cross-correlation threshold, the cross-correlation threshold being significantly less than unity.

27. The transmitter of claim 26, wherein each of the at least two training sequences having the normalized auto-correlation below the auto-correlation threshold comprises a sum of the squares of a normalized auto-correlation of one of the at least two training sequences over an auto-correlation window being below the auto-correlation threshold.

28. The transmitter of claim 26, wherein each pair of the at least two training sequences having the normalized cross-correlation below the cross-correlation threshold comprises a sum of the squares of a normalized cross-correlation of the pair of the at least two training sequences over a cross-correlation window being below the cross-correlation threshold.

29. The transmitter of claim 26, wherein the auto-correlation threshold is 0.06.

30. The transmitter of claim 26, wherein the cross-correlation threshold is 0.12.

31. The transmitter of claim 26, wherein the transmitter is adapted for use in a system having frequency selective fading.

32. The transmitter of claim 26, wherein:

the normalized auto-correlation is an auto-correlation normalized by the number of symbols in one of the training sequences, and the normalized cross-correlation is a cross-correlation normalized by the number of symbols in one of the training sequences.

33. The transmitter of claim 26, wherein the cross-correlation is taken over a window of −L+1 to 0 and 0 to L−1, L being the number of symbols over which multipaths of significant power can arrive.

34. The transmitter of claim 26, wherein the auto-correlation is taken over a window of −L+1 to L−1, excluding 0, L being the number of symbols over which multipaths of significant power can arrive.

* * * * *